United States Patent [19]
Togashi

[11] Patent Number: 6,099,172
[45] Date of Patent: Aug. 8, 2000

[54] SIMPLIFIED CAMERA MECHANISMS

[75] Inventor: Nobuhiko Togashi, Tokyo, Japan

[73] Assignee: Polaroid Corporation, Cambridge, Mass.

[21] Appl. No.: 09/325,485

[22] Filed: Jun. 3, 1999

[51] Int. Cl.[7] .............................. G03B 17/38; G03B 9/02
[52] U.S. Cl. ........................................... 396/502; 396/505
[58] Field of Search .................................. 396/502, 263, 396/505, 543, 299, 297

[56] References Cited

U.S. PATENT DOCUMENTS

| | | | |
|---|---|---|---|
| 3,186,319 | 6/1965 | Hochstein | 396/502 |
| 3,307,460 | 3/1967 | Land | 396/299 X |
| 3,839,607 | 10/1974 | Ogihara | 200/33 R |
| 3,946,408 | 3/1976 | Taguchi | 396/502 |
| 4,166,686 | 9/1979 | Schrader | 396/502 |
| 4,504,133 | 3/1985 | Nakai et al. | 396/543 X |
| 5,059,993 | 10/1991 | Harvey | 396/263 |
| 5,579,069 | 11/1996 | Park | 396/297 X |
| 5,838,999 | 11/1998 | Norris | 393/33 |
| 5,867,742 | 2/1999 | Salvas et al. | 396/263 |
| 5,870,633 | 2/1999 | Norris | 363/33 |
| 5,888,693 | 3/1999 | Meschter et al. | 430/208 |

*Primary Examiner*—W. B. Perkey
*Attorney, Agent, or Firm*—Leslie Payne

[57] ABSTRACT

A simplified camera mechanism and method for allowing an operator to select distinct ones of several apertures by actuation of a finger engageable aperture selector as well as insure return of the selector to an initial mode position as a shutter actuator assembly returns to its original unactuated position following release thereof by the operator.

15 Claims, 13 Drawing Sheets

LOCKED

FIG. 4

LOCKED

FIG. 5

POSITION 1

FIG. 6

POSITION 1

FIG. 7

POSITION 2

FIG. 8

POSITION 2

FIG. 9

POSITION 3

FIG. 10

POSITION 3

FIG. 14
LOCKED AGAIN

SIMPLIFIED CAMERA MECHANISMS

BACKGROUND OF THE INVENTION

The present invention relates generally to selectors and actuators for photographic apparatus, and more particularly, to simplified selectors and actuators for performing multiple camera functions in combination with other camera elements.

The prior art is characterized by efforts to make photographic cameras simplified and compact. Examples of known approaches are described, for example, in U.S. Pat. No. 3,839,607 issued to Ogihara; and U.S. Pat. No. 5,867,742 issued to Salvas et al. The latter patent describes a manual selector that is movable from an initial mode position to anyone of a plurality of discrete mode setting positions, whereby the selector is also operable for actuating a strobe unit in some of the mode positions. This patent describes means for automatically returning the manual selector to the initial mode position following a camera operating cycle.

Despite the existence of these known approaches, there is nevertheless a continuing desire to make improvements in the ease and reliability of camera use, as well as the simplification and compactness of overall camera construction.

SUMMARY OF THE INVENTION

According to the principles of the present invention provision is made for a camera having a shutter mechanism; actuating means for actuating the shutter mechanism; and, an aperture selecting assembly that is movable from an initial mode position to at least a first mode position in response to manipulation thereof for setting at least one exposure aperture. The actuating means includes a finger engageable portion that is biased to a first position and when depressed by a force applied thereto is movable to a second position for actuating the shutter mechanism. Included in the camera is the finger engageable portion being movable relatively rotatably and vertically to and within a passageway of the aperture selecting assembly. Provision is made for a coupling element movable within the finger engageable portion and being selectively coupled to portions of the aperture selecting assembly for rotatably returning the selecting assembly to the initial mode position as the finger engageable portion returns to the first position from the second position following actuation.

In an illustrated embodiment of the present camera, provision is made for the aperture selecting mechanism including a selector body rotatably mounted within the camera which defines the selector passageway; an external camming device on the periphery of the body for cooperating with the shutter mechanism; and an internal camming device in the passageway for cooperating with a first portion of the coupling element.

In an illustrated embodiment of the present camera, provision is made for the selector body being rotated manually to one of a plurality of preselected aperture setting mode positions from the initial inoperative mode position.

In an illustrated embodiment of the present camera, provision is made for the finger engageable portion including a spindle having a button at an end portion protruding from the camera, wherein the spindle is relatively vertically and rotatably movable within the passageway.

In an illustrated embodiment of the present camera, provision is made for the selector body defining an opening within which a second portion of the coupling member is situated when the selecting assembly is in the initial mode position, whereby relative vertical movement of the finger engageable portion from the first to the second position is limited, thereby preventing shutter actuation.

In an illustrated embodiment of the present camera, provision is made for the selector body including detents cooperating with the first end portion of the coupling member for detenting the rotational movement of the selector body for each of the rotational mode selecting positions of the selector body.

In an illustrated embodiment of the present camera, provision is made for the internal camming surfaces of the selector body include first and second camming segments, each of which cooperate with the second end portion of the coupling element; such that the second end portion engages the first segment and rotatably drives the selector body back to the initial mode position, and the second camming segment drives the first end portion of the coupling element into the selector body opening when the selector has returned to the initial mode position.

In an illustrated embodiment of the present camera, provision is made such that when the selector body moves from the initial mode position, it forces the first portion of the coupling element inwardly relative to the opening, thereby freeing the selector body for relative rotational and vertical movement with respect to coupling element and spindle and thus allowing shutter actuator and shutter selection.

A method of returning a camera selector to an original position from at least one of a plurality of positions in a camera following actuation of a camera element by an actuating means for actuating the camera element. The method comprises the steps of: providing the selector with an internal passage having camming surfaces, wherein the selector is operative for rotational movement between an original and a plurality of operative positions; providing the actuating means with a biased actuating device that is relatively rotatably and longitudinally movable within the passage, wherein when an application force is applied to the device against a biasing force, the device moves relatively longitudinally from a first position to a second position, whereby the camera element is actuated; and, rotationally returning the selector to the original position by providing a coupling element carried by the device which engages the camming surfaces and converts the relative longitudinal movement of the device when returning from the second position to the first position into rotational movement of the selector to the original position.

It is an object of the present invention to provide cameras that are simplified in construction and reliable in use.

It is an object of the present invention to provide for a simplified camera that is user friendly and reliable in operation; particularly for younger operators.

It is an object of the present invention to provide a camera having mechanisms for selecting camera modes and actuators that are operable for actuating multiple camera functions including aperture selection, shuttering, and strobe firing.

It is an object of the present invention to provide for a simplified camera of the above type that returns the selector automatically to an initial mode setting position.

It is an object of the present invention to provide for a camera having a selector that is manually displaceable for selecting multiple camera modes by having a selector move from an initial mode setting position to anyone of a plurality of operating mode positions, and subsequently returning automatically to the initial mode setting position following shutter operation.

It is an object of the present invention to provide a simplified camera requiring manual operation of a selector mechanism for selecting aperture and for energizing a strobe unit prior to actuation of a shutter release button for commencing exposure.

Other objects and further scope of applicability of the present invention will become apparent after reading a detailed description when taken in conjunction with the accompanying drawings wherein like reference numerals indicate like structure throughout the several views.

DETAILED DESCRIPTION

Reference is made to FIGS. 1–14 for illustrating one preferred embodiment of a camera 20 made in accordance with the present invention. Included in the camera 20 is a light-tight housing assembly 22 comprising a front wall casing 23, a rear wall casing 24, and a bottom door 26 that is pivoted to the front and rear casings between open and closed positions, thereby facilitating loading and reloading of a film assemblage 28 therein in a manner as described generally in commonly-assigned U.S. Pat. No. 5,870,633, which description is incorporated herein and made a part hereof. A manually operated releasable latch mechanism 30 releasably retains the bottom door 26 in a latched closed condition. The camera is also envisioned to be a one-time use camera wherein the door would be locked and the film preloaded prior to use.

The film assemblage 28 is, preferably, made of the self-developing kind, that is particularly adapted to be used in a camera of the above type of construction. The film is similar in construction to that described in commonly-assigned U.S. Pat. Nos.: 5,838,999 and 5,888,693, and hence, the descriptions thereof are incorporated herein and made a part hereof. Thus, only those portions of the film assemblage necessary to understand the present invention will be set forth herein. In this regard, the film assemblage 28 is in the form of a strip 33 with separable individual film frames 31 being housed in a foldably stacked relationship within a cassette (not shown). A leading tab 32 portion of each frame 31 is adapted to protrude from an exit slot 34 (FIG. 4) and a light flap 35 formed adjacent one end of the camera housing 22 so that an operator can grasp and pull the film for indexing the latter.

Figure 4:
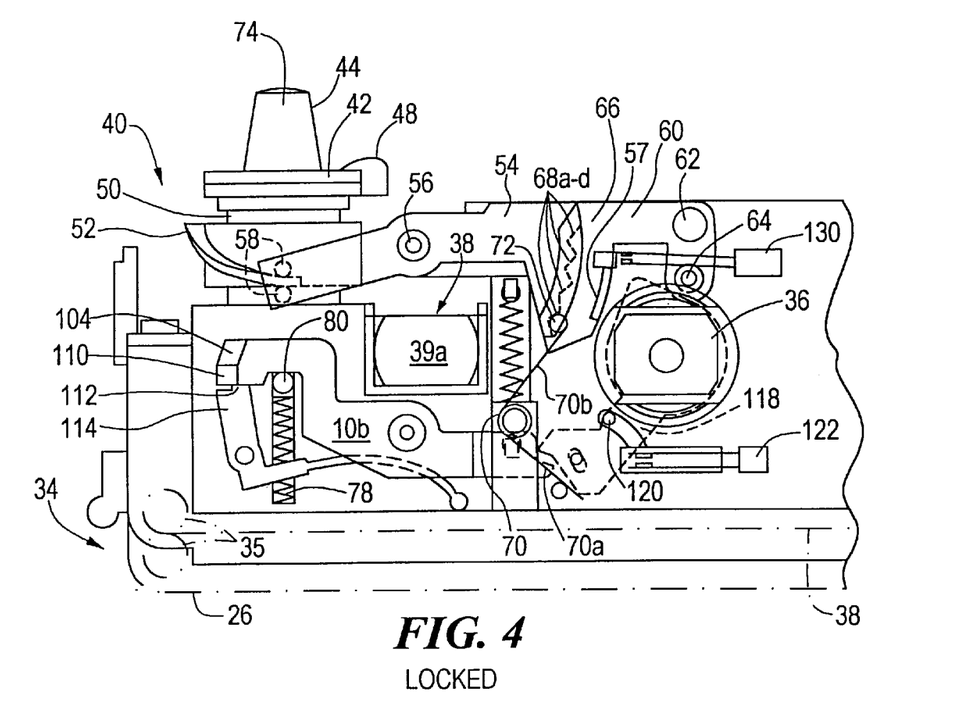
FIG. 4 is an elevation view of the camera portion shown in FIG. 3.
Figure 5:
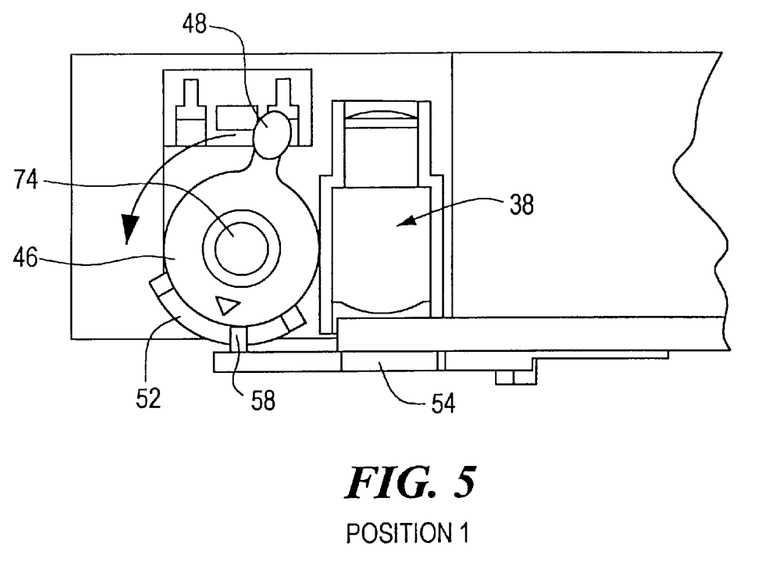
FIG. 5 is a plan view similar to FIG. 3, but illustrating the aperture selecting and shutter actuating mechanisms of the present invention in a first operative mode position.

The film frames 31 are frangibly connected to each other. Thus, pulling a leading tab 32 effects processing of an exposed film unit as the latter is withdrawn from the camera and passes through a nip defined by processing rollers 35 (FIG. 4). As a result, each of the emerging film frames separate from a successive film frame held within the camera owing to their frangible connections. In this regard, the next successive film frame has been simultaneously indexed from the film cassette and is registered for exposure at the focal plane defined by a taking lens 36 and mirror (not shown). Situated adjacent the taking lens 36 is anyone of several kinds of viewfinder assemblies 38 and includes lenses 39a, 39b. Separation of the film frames does not occur until the successive film frame is indexed to the focal plane and a leading tab thereof emerges from the exit slot 34. While the foregoing film assemblage is disclosed, the present invention is not limited to the kinds of mechanisms and media for capturing and recording images, but is related broadly to any camera employing shutter and aperture setting mechanisms.

Continued reference is made to FIGS. 1–21, wherein an improved aperture selecting and shutter actuating mechanism 40 is illustrated. Essentially included in the mechanism 40 is an aperture mode selector assembly 42 and, in combination therewith, a shutter release assembly 44. The aperture mode selector assembly 42 includes a selector ring 46 having a finger-engageable selector member or lever 48 radially protruding therefrom for allowing an operator to rotatably displace the ring to one of a plurality of preselected aperture mode setting positions. The selector ring 46 is coupled to the top of a hollow selector body 50 having a barrel shape that is mounted for rotation within the housing about a vertical axis. The selector body 50 has a thin ribbed exterior camming element 52 that partially encircles it in a helical like fashion; as illustrated.

Figure 6:
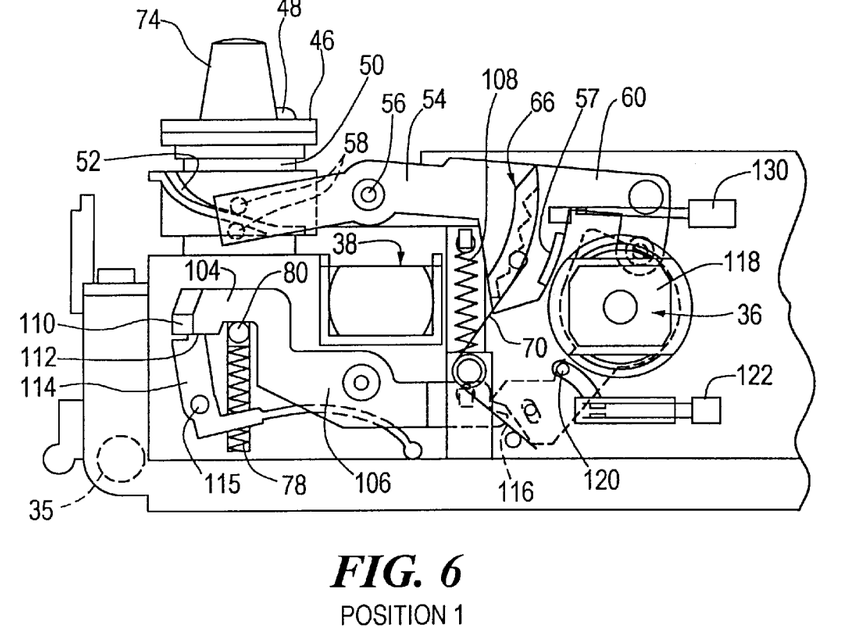
FIG. 6 is an elevation view of the portion illustrated in FIG. 5.
Figure 7:
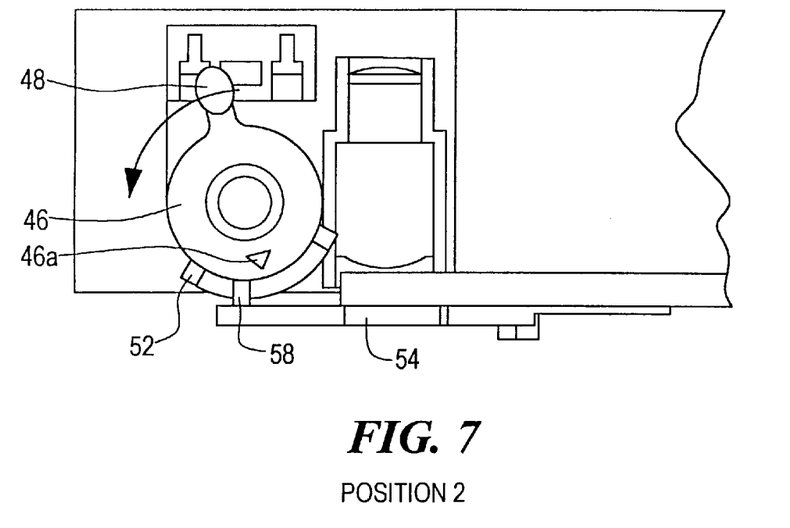
FIG.7 is a plan view of the aperture selecting and shutter actuating mechanisms of the present invention depicted shown in a second operative mode position.
Figure 8:
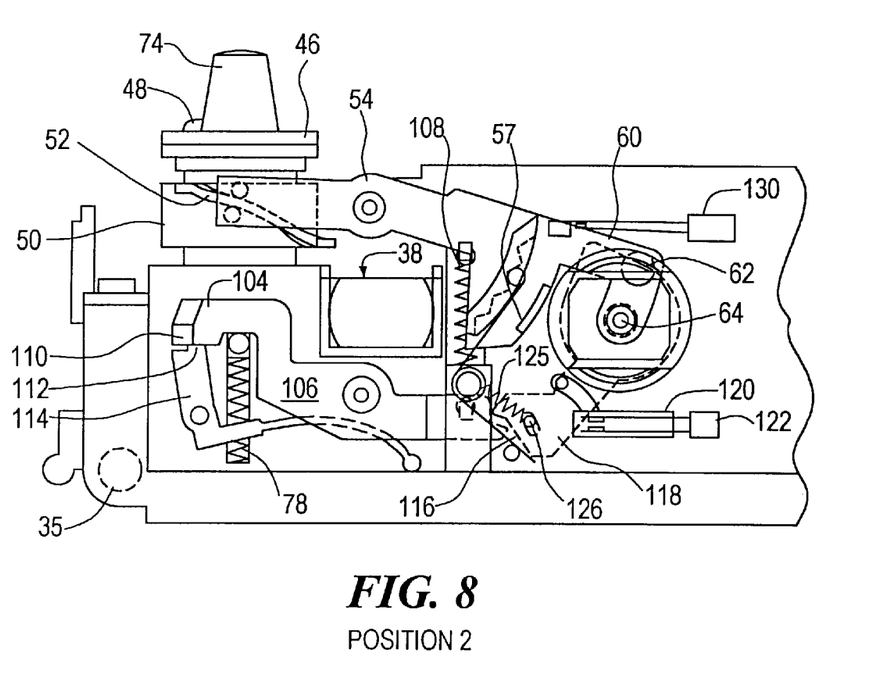
FIG. 8 is an elevation view of the camera portion illustrated in FIG. 7.
Figure 9:
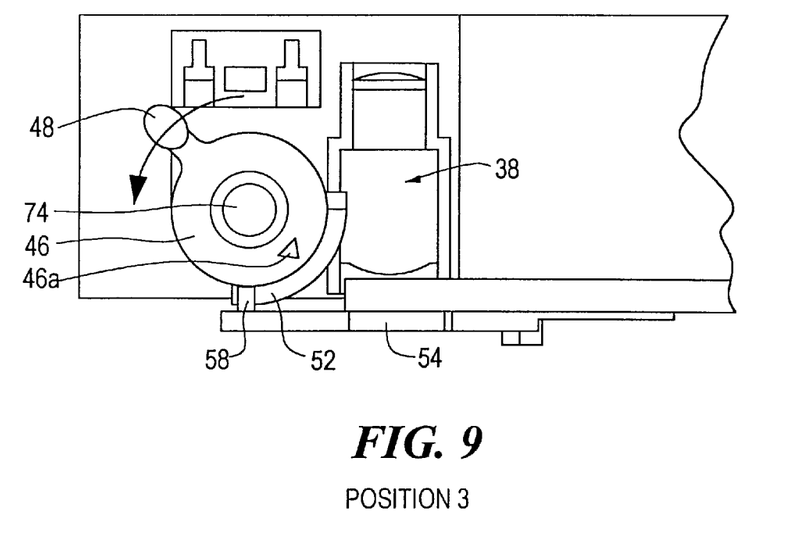
FIG. 9 is a plan view of a portion of the aperture selecting and shutter actuating mechanisms depicted in a third operative mode position.
Figure 10:
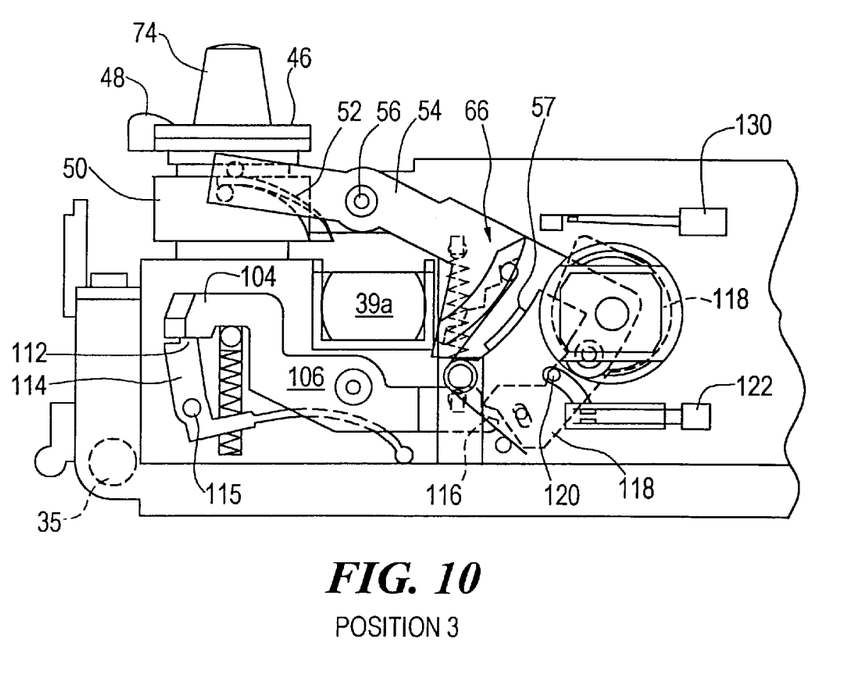
FIG. 10 is an elevation view of the camera portion illustrated in FIG. 9.

An aperture selector arm 54 is centrally pivoted at 56 to a portion of the housing assembly and has a yoke 58 at one end that rides slidably on the camming element 52. Rotation of the body 50 in response to rotation of the selector member 48 results in pivoting movement of the arm 54 as the yoke tracks the camming element. The opposite end of the arm 54 is provided with a depending and generally arcuate aperture plate 60 provided with a pair of apertures 62, 64 having different f-numbers corresponding to, in this embodiment, the sunny and cloudy ambient light conditions; respectively. The aperture plate 60 is pivotable, as will be described, to a plurality of discrete preselected positions, whereby the plate and the apertures are in registry with an optical axis (not shown) of the taking lens 36. As shown in FIGS. 4 and 6, the aperture plate 60 is positioned to be in an unblocking relationship out of the optical path when the selector ring 46 is in the "OFF" position (FIG. 4); or "Indoor" (FIG. 6) positions; whereas the aperture 62 is in optical path when the selector is in a position that corresponds to a "Sunny" position (FIG. 8); and the aperture 64 is in the optical path that corresponds to a "Cloudy" position (FIG. 10). A detent mechanism 66 is located intermediate the pivot 56 and the aperture plate 60 and, in this embodiment, includes a plurality of radially arranged and circumferentially separated teeth members 68a–d; each one of which corresponds to one of the four preselected aperture select positions of the selector ring. A torsion spring 70 is mounted on the housing block and has one leg 70a against a post and a second leg 70b with a protrusion 72 at a distal end thereof that resilently latches respective ones of the teeth 68a–d as the latter move therepast. The latching provides for fine adjustment of selector ring displacement.

Reference is now made to FIGS. 15–33 wherein the shutter release assembly 44 is illustrated in a variety of operative conditions. The shutter release assembly 44 is depicted as including a finger engageable shutter button 74 attached to an upstanding actuating spindle 76 that is biased upwardly by a return spring 78 mounted within the camera body. Both the shutter button 74 and shutter spindle 76 are adapted to move within a central passageway 55 of the selector body 50. A post 80 extends radially from a bottom portion of the spindle 76 and cooperates with the shutter assembly 82 in a manner to be described. It will be appreciated that the spindle 76 does not rotate, but only reciprocates.

Reference is now made to FIGS. 16–21 and 30–34 for illustrating a coupling mechanism 84 that is operative for selectively coupling the spindle 76 to the selector body 50 for converting the relative axial displacement of the spindle to rotational displacement of the selector body. In one preferred embodiment, the coupling mechanism 84 includes a coupling element 86 in the form of a rigid steel pin that slides in an opening 88 that is generally transverse to a longitudinal axis of the spindle 76. In this embodiment, a viscous liquid is placed over the coupling element so as to inhibit its undesired sliding. The spindle 76 reciprocates within a passageway 55 in the selector body 50. The element 86 is adapted to slide between diametrically opposed openings in the spindle for cooperation with internal camming surfaces in the selector body 50, in a manner to be described. One end portion 94 of the coupling element 86 is adapted to move radially with respect to a window 96 (FIGS. 16–21) that is formed in a wall portion of the selector body. The end portion 94 is adapted to cooperate with circumferential detents 98 that are formed in the selector body, as shown in FIGS. 16, 17 and 24–26 for detenting the rotational movement of the selector body. The opposite end portion 95 of the coupling element 86 is adapted to engage internal cam surfaces 100 and 102 as will be described in order to convert the relative linear movement of the spindle 76 into the rotational movement of the selector body 50 for automatically returning the latter to the "OFF" position following exposure.

Figure 1:
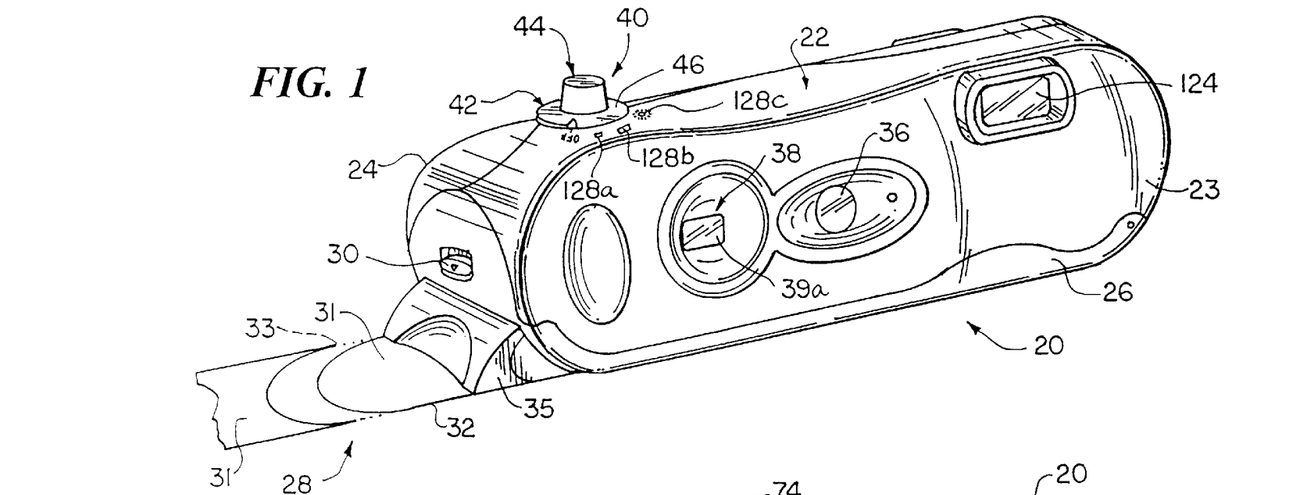
FIG. 1 is a perspective view of a camera embodying the principles of present invention.
Figure 2:
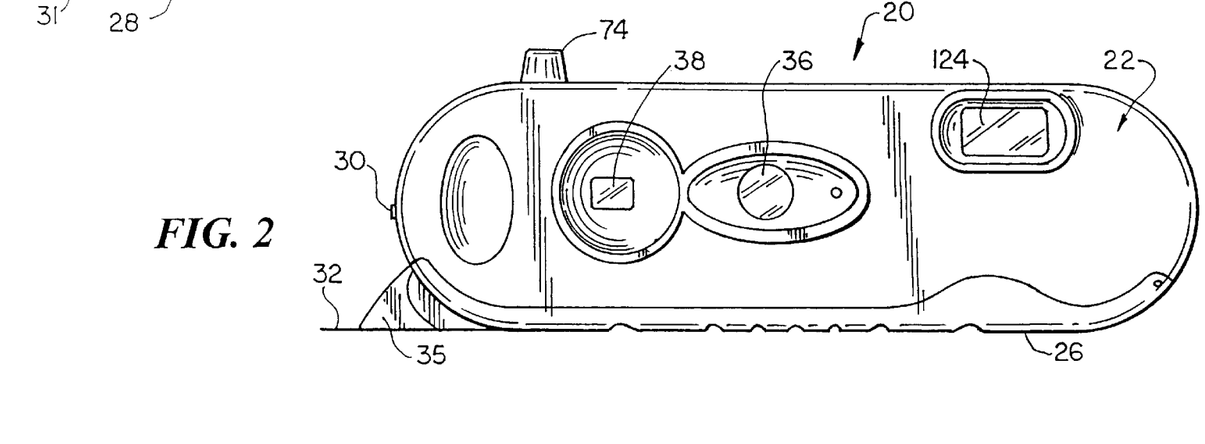
FIG. 2 is an elevation view of the camera of the present invention.
Figure 3:
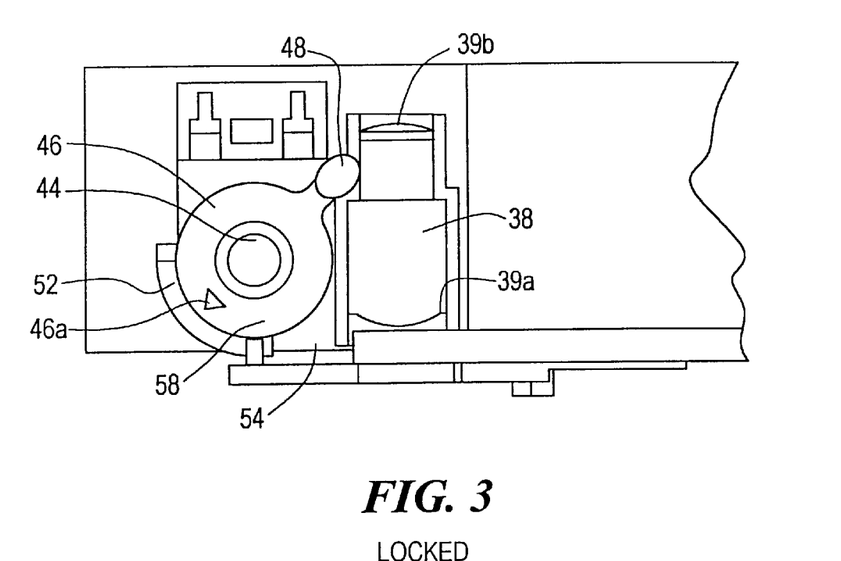
FIG. 3 is a plan view of the camera with the housing portions omitted for illustrating a portion of an aperture selecting and shutter actuating mechanisms in an initial inoperative mode position.
Figure 11:
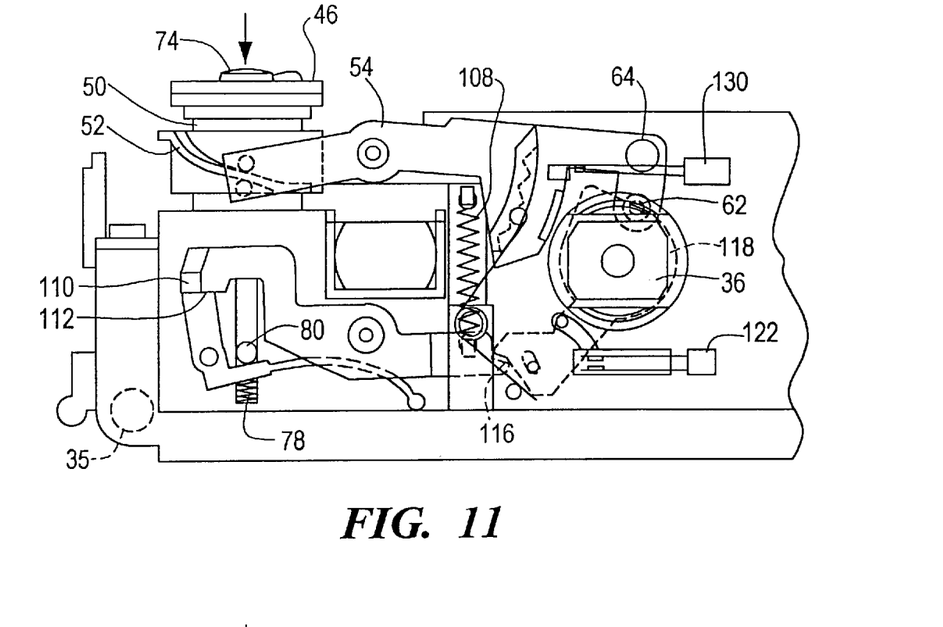
FIG. 11 is a view similar to FIG. 4, but illustrating actuation of the shutter actuating mechanism in one condition of actuation.
Figure 12:
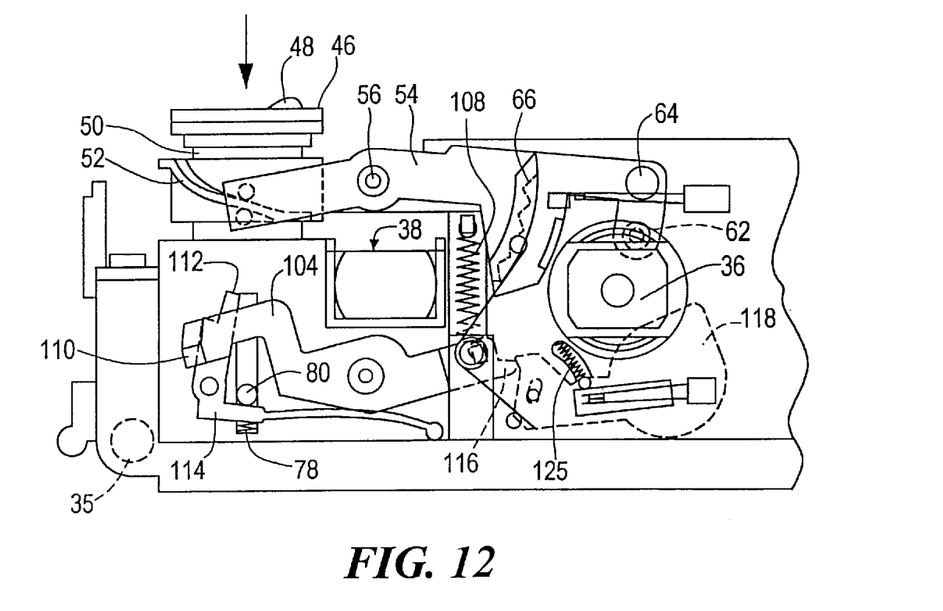
FIG. 12 is a view similar to FIG. 11, but illustrating the shutter release button in a further condition of actuation.
Figure 13:
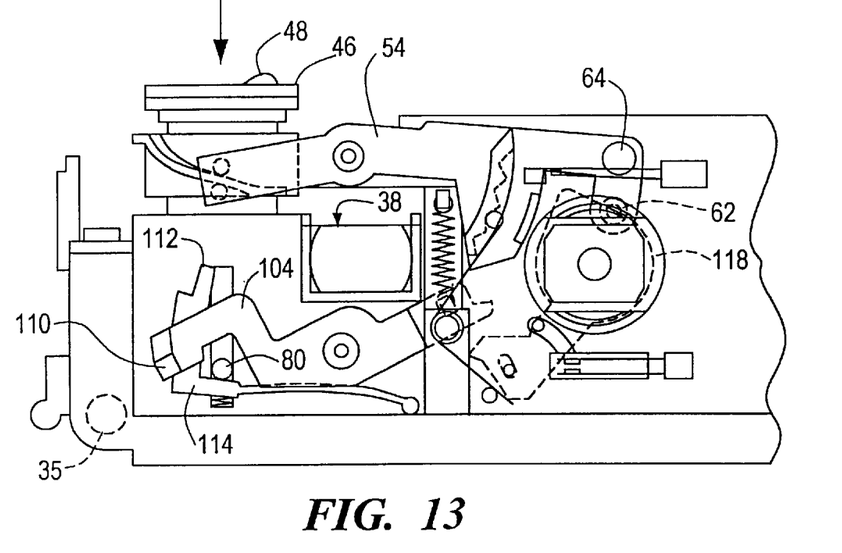
FIG. 13 is a view similar to FIGS. 11 and 12, but illustrating the shutter release button in a bottomed condition.
Figure 14:
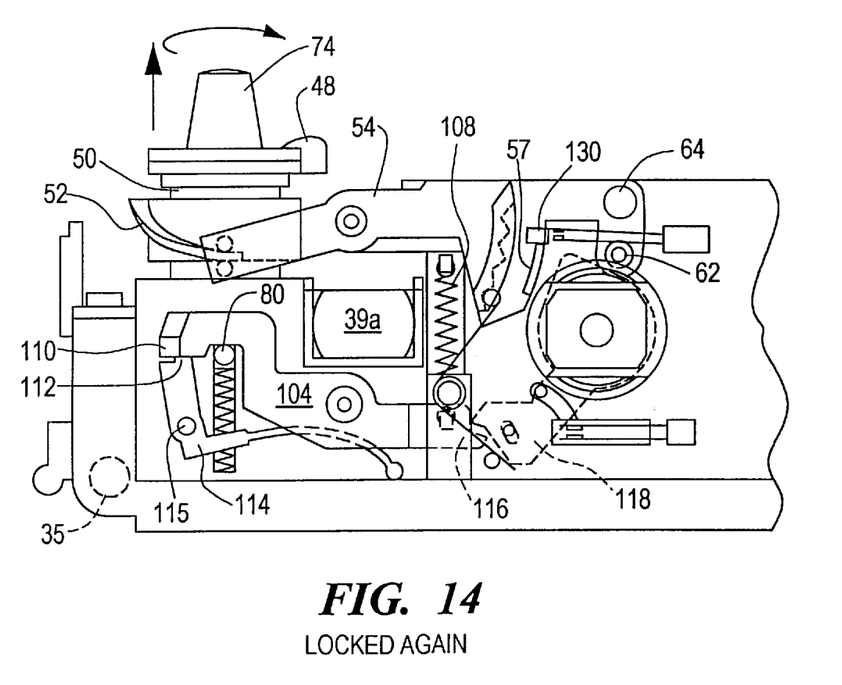
FIG. 14 is a view similar to FIG. 13, but illustrating the shutter actuating mechanism and selecting mechanism returned to their original positions.
Figures 15, 16:
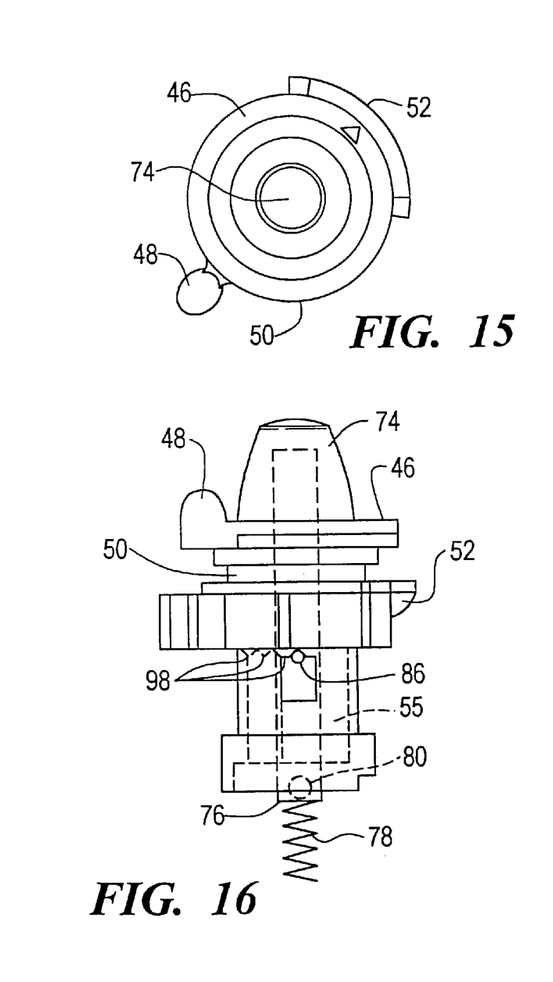
FIG. 15 is a plan view that illustrates an aperture selector ring in one mode of operation.
FIG. 16 illustrates an enlarged and fragmented elevation view of the aperture selector and shutter actuating mechanisms in one operative condition.
Figure 17:
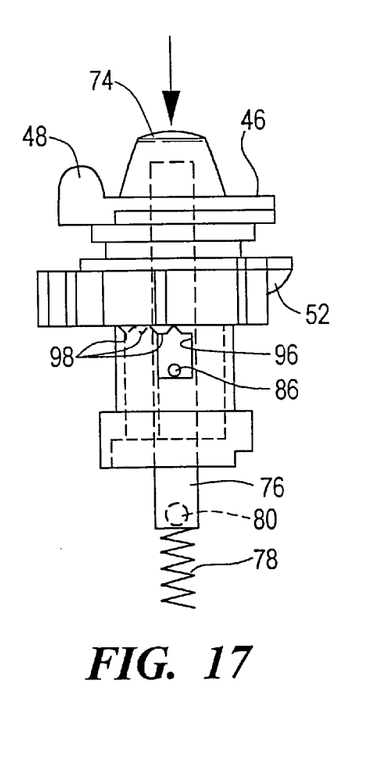
FIG. 17 is a view similar to FIG. 16, but illustrating the shutter mechanism being depressed.
Figure 18:
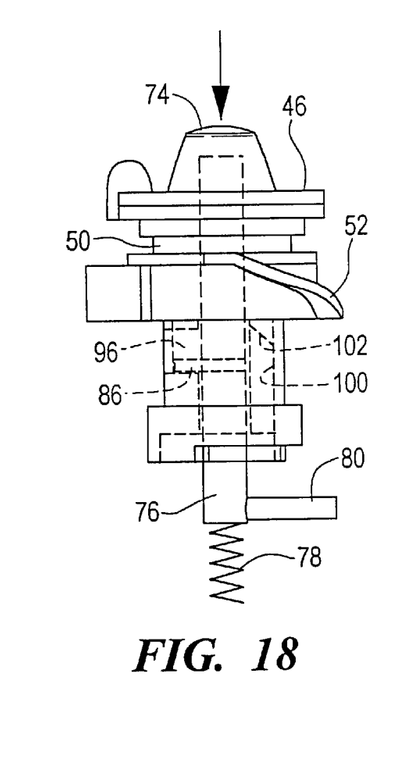
FIG. 18 is a view similar to FIG. 17, but illustrating an elevation view of the aperture selector mechanism in a state of actuation.
Figure 19:
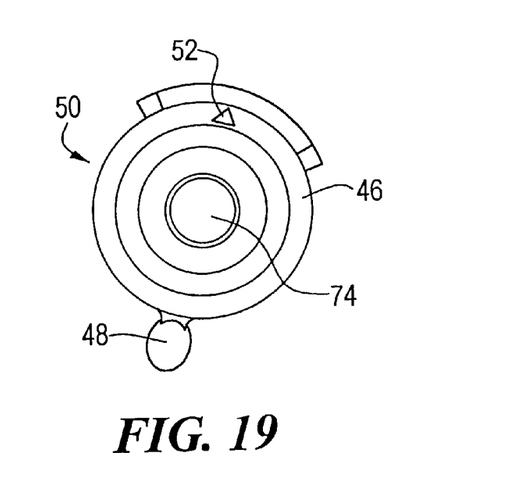
FIG. 19 illustrates a plan view of the aperture selector being in another condition of actuation.
Figure 20:
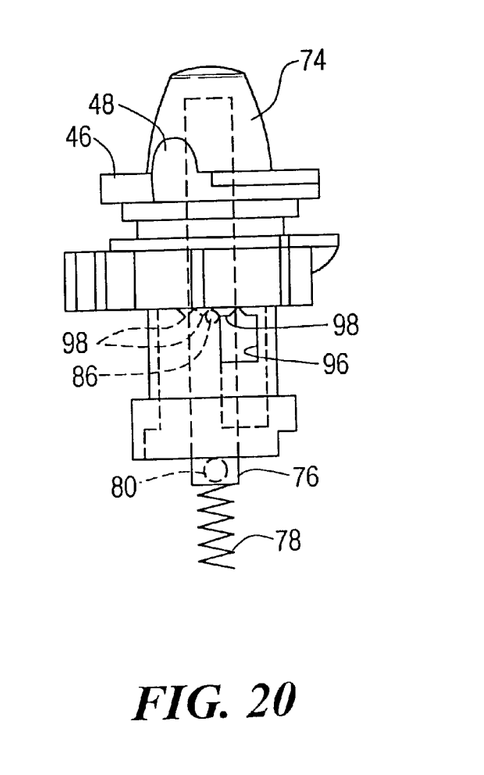
FIG. 20 illustrates an elevation view of the aperture selector mechanism in a state of actuation.
Figure 21:
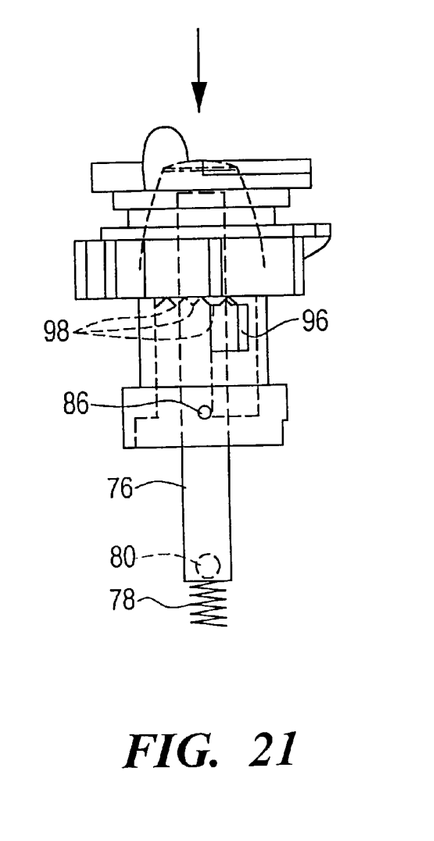
FIG. 21 illustrates and elevation view of the aperture selector being in another condition of actuation.
Figure 22:
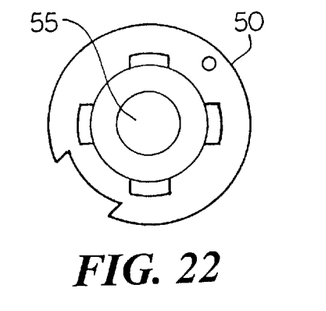
FIG. 22 is a plan view of a selector barrel body.
Figure 23:
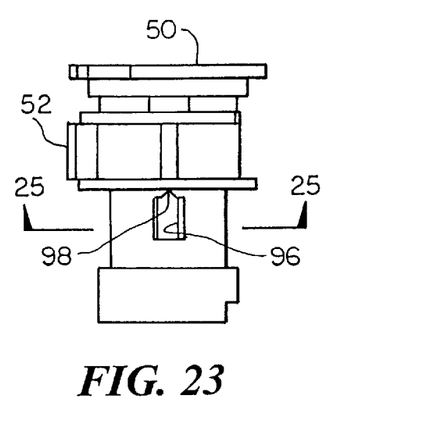
FIG. 23 is a an elevation view of the selector barrel.
Figure 24:
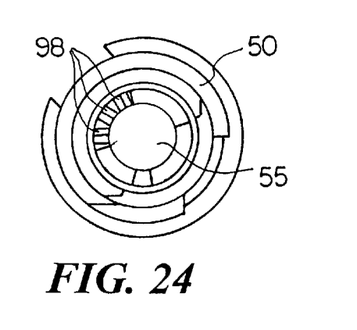
FIG. 24 is a bottom view of the selector barrel.
Figure 25:
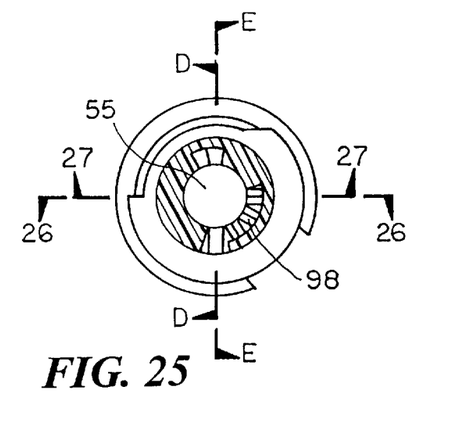
FIG. 25 is a cross-sectional view of the selector taken along section line 25—25 appearing in FIG. 23.
Figure 26:
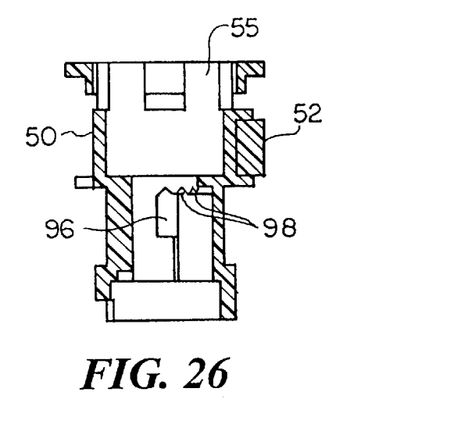
FIG. 26 is a cross-sectional view of the selector taken along section line 26—26 appearing in FIG. 25.
Figure 27:
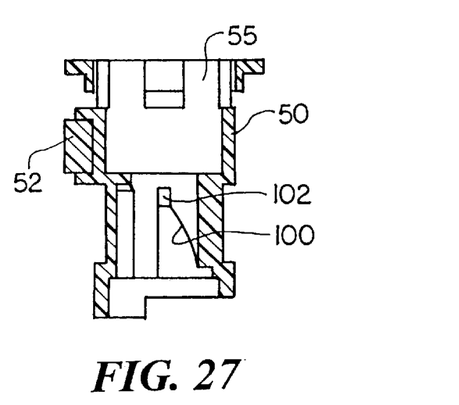
FIG. 27 is a cross-sectional view of the selector taken along section line 27—27 appearing in FIG. 25.
Figure 28:
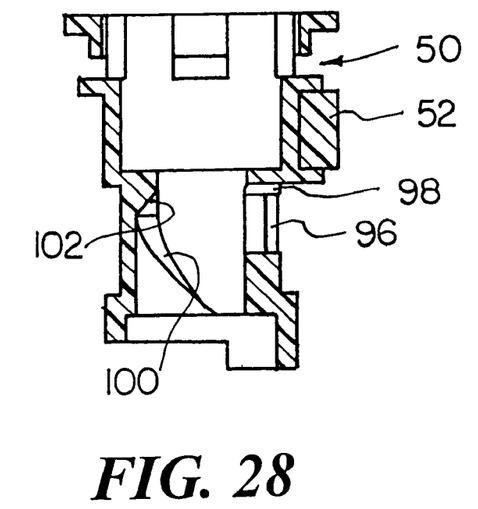
FIG. 28 is a cross-sectional view of the selector taken along section line 28—28 appearing in FIG. 25.
Figure 29:
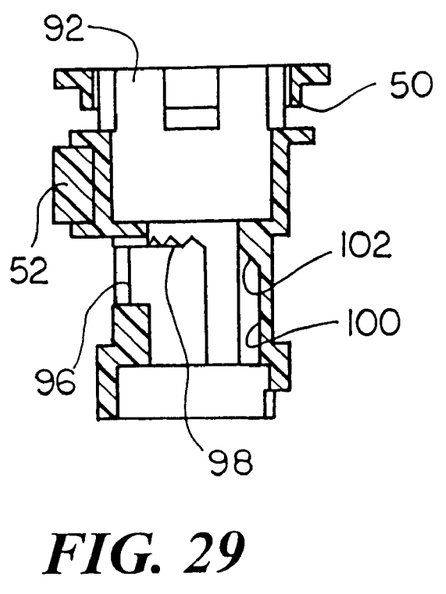
FIG. 29 is a cross-sectional view of the selector taken along section line 29—29 appearing in FIG. 25.
Figure 30:
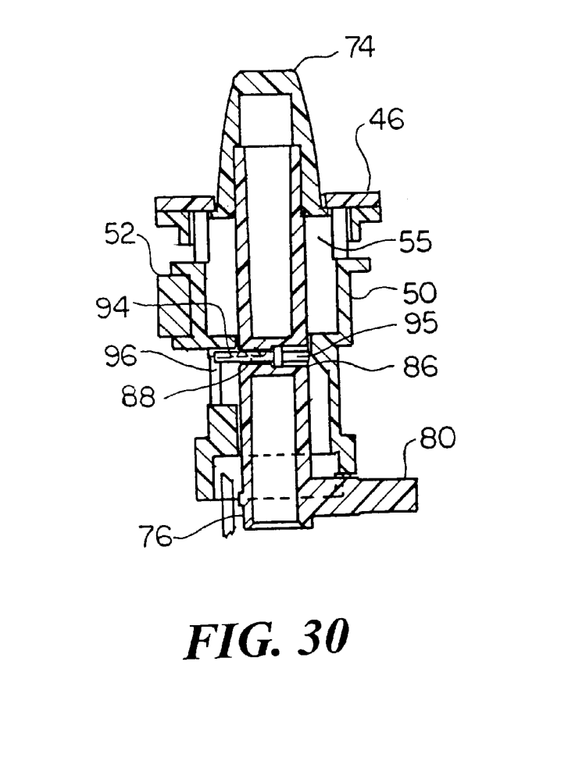
FIG. 30 is a vertical cross-sectional view of the aperture selector and shutter mechanisms of the present invention in one position.
Figure 31:
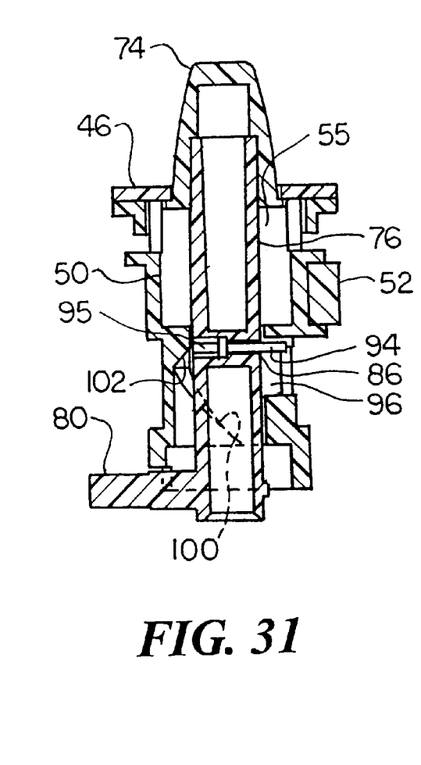
FIG. 31 is a vertical cross-sectional view of the aperture selector and shutter mechanisms of the present invention as viewed from the side opposite that depicted in FIG. 30.
Figure 32:
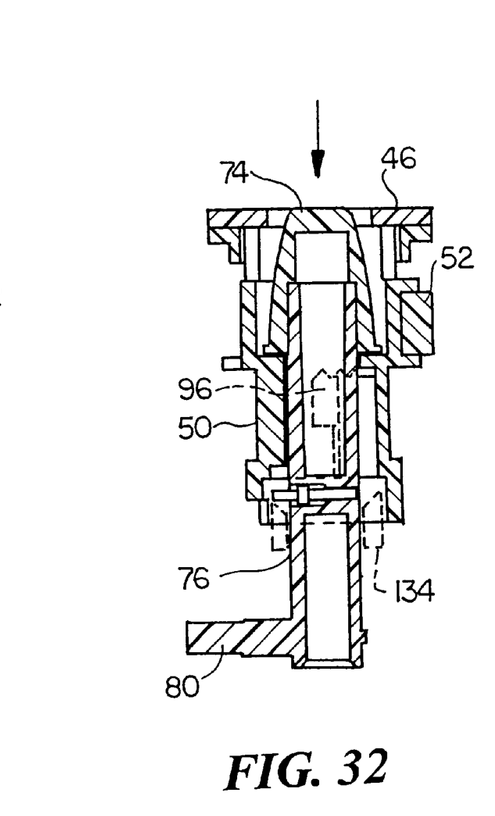
FIG. 32 is a vertical cross-sectional view of the aperture selector and shutter mechanisms of the present invention in a state of being actuated.
Figure 33:
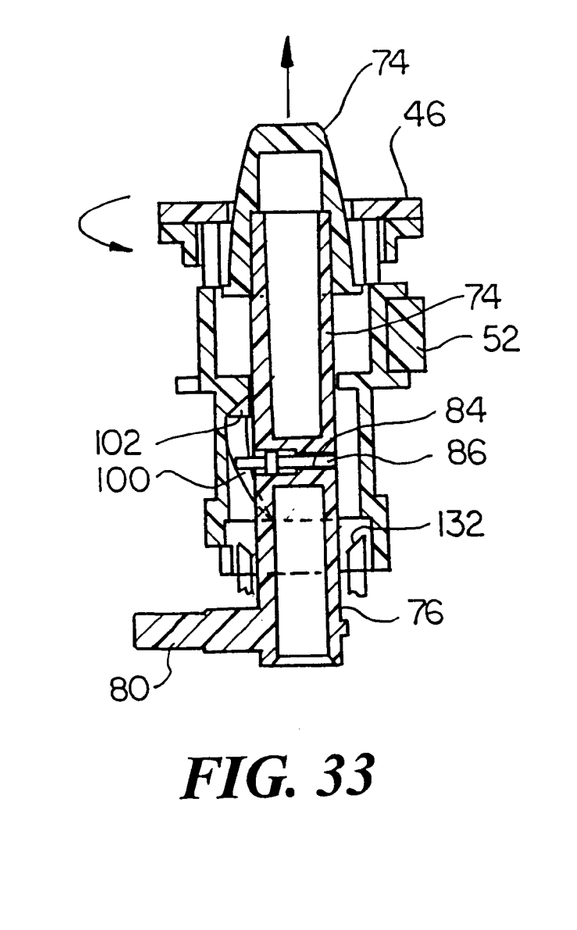
FIG. 33 is a vertical cross-sectional view of the aperture selector and shutter mechanisms of the present invention being returned to the one position; and, FIG. 34 is a vertical cross-sectional view of the aperture selector and shutter mechanisms returned to the original position.
Figure 34:
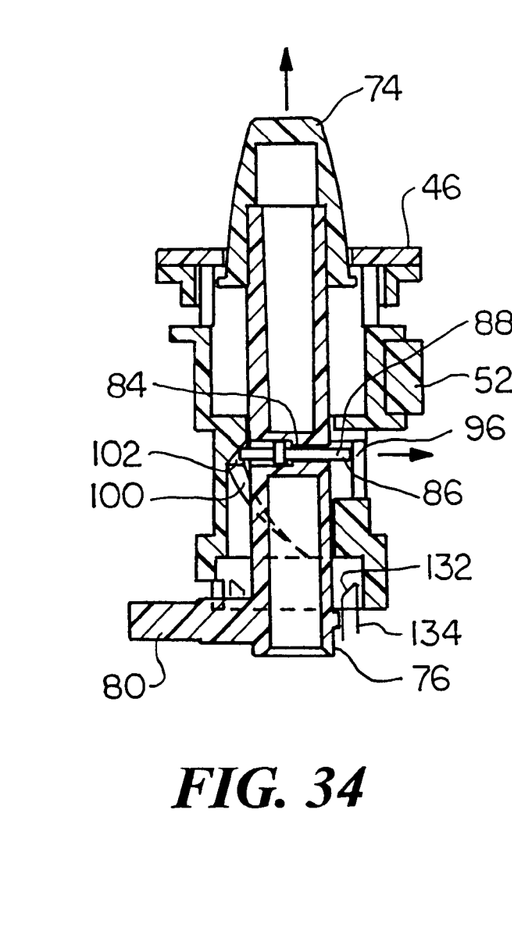

Reference is made back to the shutter actuating assembly 82; wherein in the initial, non-operative (locked) or "OFF" mode of the camera (FIG. 4), the post 80 is biased upwardly such that it engages arm 104 of a pivoted shutter hammer 106. A tension spring 108 is mounted to the camera housing and engages the opposite end of the hammer to urge upward pivotal movement of that end. A detent rib 110 on the hammer 106 engages an upper surface 112 of a biasing element 114 to retain the hammer in an inoperative position. The biasing element 114 is mounted to the camera housing at 115 and one arm thereof biases the hammer 106 upwardly following exposure; as will be explained. A kicker segment 116 of the hammer is adapted to engage one end of the shutter blade member 118. As illustrated in FIGS. 11–12, as the kicker segment 116 is displaced upwardly, it trips the shutter blade 118, thereby rotating the latter counterclockwise and thus to the open position for allowing film exposure. A pin 120 on the shutter 118 also moves and commences firing of the strobe unit by engaging a switch element of the strobe fire switch 122. The strobe fire switch 122 is connected electrically, to the strobe circuit board (not shown), and when activated energizes the strobe 124 (FIGS. 1 & 2). In this camera, the strobe is fired at every exposure. As the kicker segment 116 rides along the shutter blade 118, a spring 125 (FIG. 12) coupled to the pin 120 is effective for returning the shutter blade to its closed position, (FIG. 4);

whereupon the pin 120 returns in a path defined by the slot 126 to its original position. Whenever the application of an actuating force on the shutter button 74 is released, the return spring 78 is active to drive the shutter spindle 76 and the button 74 to their original upright position for subsequent energization. The biasing element 114 also serves to drive the hammer 106 back to its original position; whereupon the rib 110 reengages the upper surface 112 and further inhibits the shutter from being actuated.

An exposure cycle of the present invention will be described. In the initial inoperative or "OFF" mode, the selector ring 46 is in the position depicted in FIG. 3. To effect camera operation, an operator rotates the selector ring 46 from its initial "OFF" setting to an appropriate iconographic marking that selects an aperture setting corresponding to one of the ambient lighting conditions under which the camera is to operate (e.g., indoor, cloudy, sunny). For instance, the selector ring 46 is rotated so that its pointer 46*a* is directed at either the "indoor" iconographic marking 128*a*, a "sunny" iconographic marking 128*b*, or a "cloudy" iconographic marking 128*c*. The markings 128*a–c* correspond to appropriate aperture selections that will yield correct exposure for the ambient mode selected when the shutter is actuated for effecting exposure. Rotation of the aperture selector ring 46 and the selector body 50 also initiates energization of the strobe circuit for energizing the strobe. In this regard, a tab 57 on the arm 54 engages an electrical contact arm of a switch 130 associated with the circuit board to maintain the switch in the OFF position. When the selector ring is rotated, the tab 57 disengages the switch contact arm and the switch closes thereby allowing energization of the strobe.

Rotation of the selector ring 46 to the first aperture selection setting 128*a* effects movement of the coupling element from interfering relationship with the window 96. It will be understood that the coupling element 86 in the "OFF" position is seated or retained in the window 96, thereby limiting complete downward movement of the actuating spindle 76 and thus, preventing or locking shutter actuation until an aperture is selected by the aperture selecting position. As the selector body 50 rotates, the external cam element 52 rotates and cams the arm 54, thereby pivoting the latter and driving the aperture plate 60 to the desired setting corresponding to the selector ring setting. As a consequence, the aperture plate 60 is appropriately positioned for correct exposure. As noted earlier, rotation of the selector body 50 is effective for commencing energization of the strobe by the tab 57 disengaging a contact arm of the strobe charging switch 130.

Because the coupling element 86 is out of registry with the window, an operator can apply force to the shutter release bottom 74 (see the arrows) in order to commence exposure. In this regard, the shutter release button is depressed; whereby the post 80 is moved downwardly without interfering relationship of the coupling element 84. This downward movement drives the rib 110 off the upper surface of the arm 104, thereby freeing the hammer 106 to follow the post downwardly under the urging of the tension spring 108. The kicker segment 116 is appropriately displaced and trips the opening of the shutter blade 118. When the shutter is in the open position, the pin 120 actuates the switch 122 thereby firing the strobe. As the kicker segment 116 continues movement, the shutter blade returns to its original closed condition under the influence of the spring 125. As the spindle nears the bottom of its stroke, the pin end portion engages a camming rim 132 on upstanding fingers 134, the latter fit within the lower end of selector body passage 50 and surround the spindle shaft as well as are formed on the camera body.

As best seen, in FIGS. 30–34, release of the shutter button 24, drives the spindle 76 upwardly under the influence of the spring. The coupling element 86 while moving upwardly is in engagement with the internal camming surface 100 and correspondingly rotates the selector body 50 in the direction of the arrow. The extent of the camming action is selected so that the barrel and the selector ring are rotated back to their original "OFF" setting. As the element 86 end nears the top end of the spindle's stroke, it engages the camming surface 102. The camming surface 102 acts to drive the coupling element 86 to the opposite side of the spindle spindle 76 so that one end thereof enters the window 96. As a result, the coupling element 86 assumes an interfering relationship with the window to thereby limit downward displacement of the shutter button 74. Advantageously for the next cycle, the camera operator must consciously reset the aperture for correct exposure. Return of the selector also disengages the strobe unit from the power source, thereby prolonging battery life. Accordingly, the camera operator need not be reminded of disconnecting the power source to the strobe. Since this camera fires the strobe for every exposure, the operator cannot take an exposure until the strobe has been energized.

Since changes may be made in the above structure and process without departing from the scope of the invitation described herein, it is intended that all matter contained in the above description as shown in the accompanying drawings shall be interpreted in an illustrative and not in a limiting sense. Those other alternatives and modifications will now become apparent to those skilled in the art without departing from the spirit and scope of the invention set forth in the following claims.

What is claimed is:

1. In a camera having a shutter mechanism; actuating means for actuating the shutter mechanism; an aperture selecting assembly that is movable from an initial mode position to at least a first mode position in response to manipulation thereof for setting at least one exposure aperture; the actuating means including a finger engageable portion that is biased to a first position and when a depressing force is applied thereto is movable to a second position for actuating the shutter mechanism; the improvement comprising: the finger engageable portion being movable relatively rotatably and vertically to and within a portion of the aperture selecting assembly; and, a coupling element movable within the finger engageable portion and being selectively coupled to portions of the aperture selecting assembly for rotatably returning the selecting assembly to the initial mode position as the finger engageable portion returns to the first position from the second position following an exposure.

2. The camera defined in claim 1 wherein the aperture selecting assembly includes a selector body rotatably mounted within the camera and defining a passageway therethrough that includes said portion; an external camming device is on the periphery of the body for cooperation with the shutter mechanism; and an internal camming device is in the passageway for cooperating with a first end portion of the coupling element.

3. The camera defined in claim 2 wherein selector body can be rotated manually to ones of a plurality of preselected mode positions including the first position from the initial mode position.

4. The camera defined in claim 3 wherein the finger engageable portion includes a spindle having a button portion at an end portion protruding from the camera, wherein the spindle is relatively vertically and rotatably movable within the passageway which includes said portion.

5. The camera defined in claim 4 wherein the selector body defines an opening within which a second end portion of the coupling member is situated when the selecting assembly is in the initial mode position, whereby when the second end portion is situated within the opening, relative vertical movement of the finger engageable portion from the first to the second position is inhibited.

6. The camera defined in claim 3 wherein the selector body includes detenting projections that cooperate with the first end portion of the coupling member for detenting the rotational movement of the selector body for each of the rotational mode selecting positions of the selector body.

7. The camera defined in claim 3 wherein the internal camming surfaces of the selector body include first and second segments, each of which cooperate with the second end portion of the coupling element; such that the second end portion engages the first segment and rotatably drives the selector body back to the initial mode position, and the second segment drives the first end portion of the coupling element into the selector body opening.

8. The camera defined in claim 7 wherein rotation of the selector body from the initial mode position forces the first end portion of the coupling element inwardly relative to the opening, thereby freeing the selector body for relative rotational and vertical movement with respect to coupling element and spindle.

9. The camera defined in claim 8 wherein the coupling element comprises a rigid elongate member mounted within the spindle for movement generally transversely to a longitudinal axis of the spindle.

10. The camera defined in claim 8 wherein the spindle has a post for engaging a shutter lever of the shutter mechanism, whereby the shutter mechanism commences a shuttering operation as the spindle travels to the second position.

11. The camera of claim 3 wherein the aperture selecting mechanism includes a pivoting arm having a cam follower at one end thereof which tracks the external camming device and an aperture member at the other end thereof, such that movement of the rotational movement of the external camming pivots the aperture member according to the direction of rotation of the selector body.

12. The camera of claim 11 wherein the pivoting arm includes a plurality of detents, each one of the detents corresponding to one of the positions of the selector body; and, a spring device mounted on the camera and having a free end that selectively engages the detents for fine positioning of the pivoting arm.

13. A method of returning a camera selector to an original position from at least one of a plurality of positions in a camera following actuation of a camera element by an actuating means for actuating the camera element; the method comprising the steps of: providing the selector with an internal passage having camming surfaces, wherein the selector is operative for rotational movement between the original and plurality of positions; providing the actuating means with a biased actuating device that is relatively rotatably and longitudinally movable within the passage, wherein when an application force is applied to the device against a biasing force, the device moves longitudinally from a first position to a second position, whereby the camera element is actuated; and, rotationally returning the selector to the original position by providing a coupling element carried by the device which engages the camming surfaces and converts the relative longitudinal movement of the device when moving from the second position to the first position into rotational movement of the selector to the original position.

14. The method of claim 13 further comprising the step of: limiting longitudinal movement of the device from the first to the second position by having the coupling element engage stroke limiting structure on the selector.

15. The method of claim 14 comprising the further step of: allowing the device to move from the first to the second positions for actuating the camera element in response to rotation of the selector from the original to at least one of the positions by having the selector move the coupling element from the stroke limiting structure.

* * * * *